(12) United States Patent
Baraff et al.

(10) Patent No.: US 6,970,171 B2
(45) Date of Patent: Nov. 29, 2005

(54) GLOBAL INTERSECTION ANALYSIS FOR DETERMINING INTESECTIONS OF OBJECTS IN COMPUTER ANIMATION

(75) Inventors: David E. Baraff, Oakland, CA (US); Andrew Witkin, Oakland, CA (US); Michael Kass, Berkeley, CA (US)

(73) Assignee: Pixar, Emeryville, CA (US)

( * ) Notice: Subject to any disclaimer, the term of this patent is extended or adjusted under 35 U.S.C. 154(b) by 459 days.

(21) Appl. No.: 09/851,940

(22) Filed: May 10, 2001

(65) Prior Publication Data

US 2002/0167513 A1 Nov. 14, 2002

(51) Int. Cl.[7] .......................... G06T 13/00; G06T 17/00
(52) U.S. Cl. ...................................... 345/473; 345/420
(58) Field of Search ................................. 345/473, 441, 345/420, 629, 597

(56) References Cited

U.S. PATENT DOCUMENTS

| | | | | |
|---|---|---|---|---|
| 5,444,838 A | * | 8/1995 | Kommrusch et al. ........ | 345/441 |
| 5,515,489 A | * | 5/1996 | Yaeger ........................ | 345/473 |
| 6,720,962 B1 | | 4/2004 | Alter | |

OTHER PUBLICATIONS

P. Volino et al., "Collision and Self–Collision Detection: Efficient and Robust Solutions for Highly Deformable Surfaces", Computer Graphics, SIGGRAPH '95 proc. 1995, pp. 137–144.*

P. Volino et al., "Accurate Collision response on polygonal Meshes", Computer Animation Conference, Philadelphia, May, 2000.*

Rossignac et al., "Interactive inspection of solids: cross–sections and interferences." ,ACM SIGGRAPH '92. 1992, pp. 353–360.*

Jeff Lander, "Skin Them Bones: Game Programming for the Web Generation", Game Developer, May 1998, pp. 11–16.*

Lafleur, B., Magnenat–Thalmann N. and Thalmann D, 1991, "Cloth Animation with Self–Collision Detection", Proceedings of IFIP WG5. 10—Modeling in Computer Graphics.*

Ascher, U., and Boxerman, E. 2002. On the modied conjugate gradient method in cloth simulation. (submitted to) The Visual Computer 19:526–531.

Baraff, D., and Witkin, A. 1998. Large steps in cloth simulation. Computer Graphics (Proc. SIGGRaph), 1–12.

Berney, J., and Redd, J. 2000. Stuart Little. SIGGRAPH Course Notes, ACM SIGGRAPH, ch. Costumes.

Breen, D., House, D., and Wozny, M. 1994. Predicting the drape of woven cloth using interacting particles. Computer Graphics (Proc. SIGGRAPH), 365–372.

(Continued)

*Primary Examiner*—Matthew C. Bella
*Assistant Examiner*—Scott Wallace
(74) *Attorney, Agent, or Firm*—Townsend and Townsend and Crew LLP

(57) ABSTRACT

A method of globally analyzing intersections between objects in computer animation includes providing objects represented by meshes, with each of the meshes being formed by a set of vertices, where a set of pairs of vertices defines a set of edges of the mesh. All edges of the meshes are checked to determine if the edges intersect with any of the meshes. An intersection path, formed by the intersection of the meshes, is traced and which vertices that are contained within the intersection path are determined. A polarity of each of the contained vertices is set to indicate that those vertices are contained within the intersection path. The analysis forms the backbone of a collision-response algorithm for unoriented objects such as cloth that is better than previous existing algorithms. The analysis also allows objects to be simulated even when hand-animated elements of the simulation have extreme amounts of interpenetration. Finally, simply displaying the nature and extent of the data found from the analysis provides extremely useful feedback to an end-user.

12 Claims, 9 Drawing Sheets

OTHER PUBLICATIONS

Bridson, R., Fedkiw, R., and Anderson, J. 2002. Robust treatment of collision, contract, and friction for cloth animation. Computer Graphics (Proc. SIGGRAPH), 594–603.

Carignan, M., Yang, Y., Magenenat–Thalmann, N., and Thalmann, D. 1992. Dressing animated synthetic actors with complex deformable clothes. Computer Graphics (Proc. SIGGRAPH), 99–104.

Choi, K., and Ko, H. 2002. Stable but responsive cloth. Computer Graphics (Proc. SIGGRAPH), 604–611.

Cordier, F., Volino, P., and Thalmann, N. 2002. Integrating deformations between bodies and clothes. The Journal of Visualization and Computer Animation 12:45–53.

Derose, T., Kass, M., and Truon, T. 1998. Subdivision surfaces in computer animation. Computer Graphics (Proc. SIGGRAPH), 85–94.

Eberhardt, B., Weber, A., and Strasser, W. 1996. A fast, flexible, particle–system model for cloth draping. IEEE Computer Graphics and Applications 16:52–59.

Gottschalk, S., Lin, M., and Manocha, D. 1996. OBBTree: A hierarchical structure for rapid interference detection. Computer Graphics (Proc. SIGGRAPH), 171–180.

Krishnan, S., and Manocha, D. 1997. An efficient surface intersection algorithm based on lowerDimensional formulation. ACM Transactions on Graphics 16, I (Jan.), 76–106. ISSN 0730–0301.

Meyer, M., Debunne, G., Desbrun, M., and Barr, A. 2001. Interactive animation of clothlike objects in virtual reality. The Journal of Visualization and Computer Animation 12:1–12.

Patrikalakis,N. 1993. Surface–to–surface intersections. IEEE Computer Graphics and Applications 13, 1, 89–95.

Provot, X. 1995. Deformation constraints in a massspring model to describe rigid cloth behavior. In Graphics Interface, Graphics Interface, 147–155.

Terzopoulos, D., and Fleischer, K. 1988. Deformable models. Visual Computer 4, 306–331.

Terzopoulos, D., Platt, J., Barr, A., and Fleischer, K. 1987. Elastically deformable models. Computer Graphics (Proc. SIGGRAPH) 11:205–214.

Volino, P., Courchesne, M., and Magnenat Thalmann, N. 1995. Versatile and efficient techniques for simulating cloth and other deformable objects. Computer Graphics (Proc. SIGGRAPH), 137–144.

Hallgren, T. et al.: "An Algorithm for Interference Detection in Cloth Animation," International Conference on Visual Computing, 129–133.

Hughes, M. et al. "Efficient and accurate interference detection for polynomial deformation," Proceedings, Computer Animation '96, Geneva Switzerland, Jun. 3–4, 1996, 155–166.

Krishnan, S. et al. (1997). "An efficient surface intersection algorithm based on lower–dimensional formulation," ACM Transactions on graphics, Association for Computing Machinery, New York, US, 16(1):74–106.

Volino, P. et al. (1995). "Versatile and efficient techniques for simulating cloth and other deformable objects," Computer Graphics Proceedings, Siggraph 95, Proceedings of Siggraph '95, Los Angeles, CA Aug 6–11, 1995, 137–144.

P. Volino et al., "*Collision and Self Collision Detection: Efficient and Robust Solutions for Highly Deformable Surfaces*", Computer Graphics, SIGGRAPH '95 proc., 1995, pp. 137–144.

\* cited by examiner

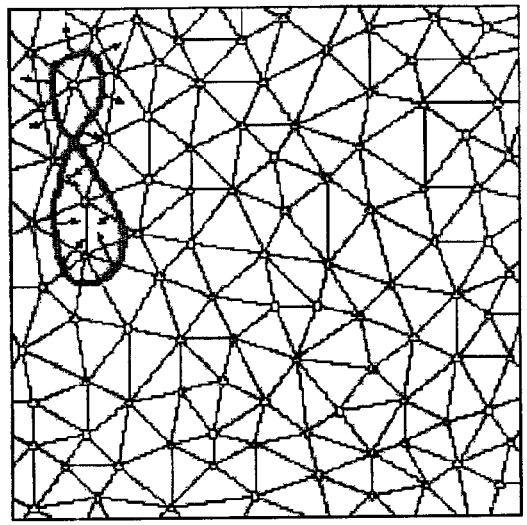
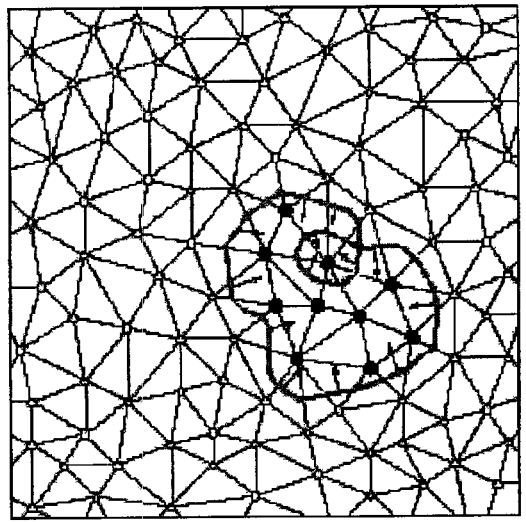
Fig. 7a
Fig. 7b
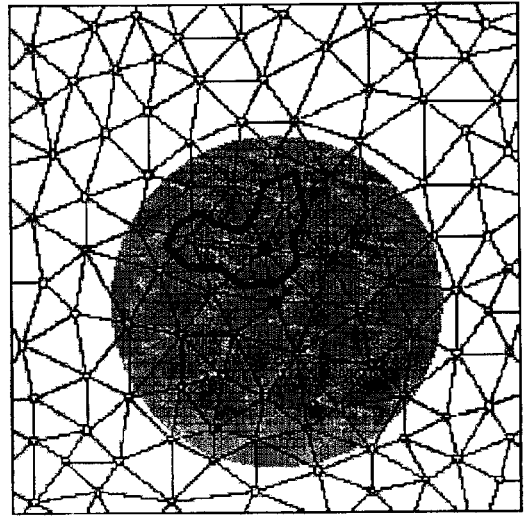
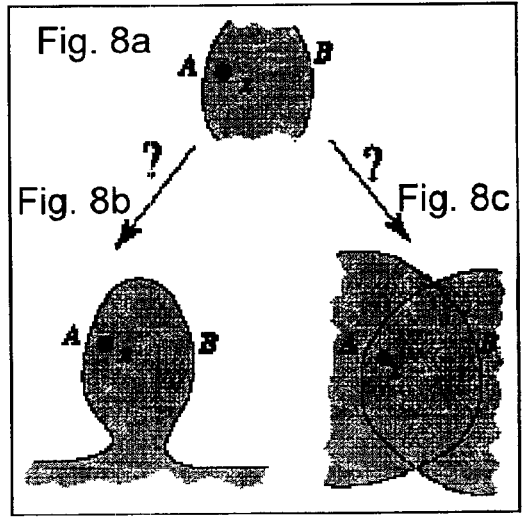
Fig. 7c

GLOBAL INTERSECTION ANALYSIS FOR DETERMINING INTESECTIONS OF OBJECTS IN COMPUTER ANIMATION

BACKGROUND OF THE INVENTION

1. Field of the Invention

The present invention relates generally to depiction of objects through the use of a computer and more specifically to computer animation of objects. The present invention is also directed to determining the intersection of computer-displayed objects and using the intersection data obtained to provide greater realistic motion and dynamics of simulated objects.

2. Description of the Related Art

Traditional animation techniques allow the animator to create the apparent motion of animated characters, to be viewed by a viewer of the animation. The use of computers to simplify the animation process has provided many benefits to the traditional hand-drawn process. Computer animated characters are well known in the prior art and have been used in many different capacities. Such characters are utilized in traditional movies, videos and online streaming of moving pictures, as well as interactive movies where the motion of characters is often initiated by a user.

Often times in the animation of characters, the characters have "secondary elements", such as clothing and hair, that are responsive to the main motion of the characters. Computer animation routinely employs physically-based numerical simulation methods to automatically produce motions for these complex secondary objects, such as clothing and hair. Determining an object's response to collisions is one of the most important aspects of this type of simulation. A simulated shirt on a human character, for example, needs to react to collisions with the character's body. The shirt must also react to collisions with itself (self-collisions) as the shirt wrinkles and folds, and to collisions with other articles of clothing (e.g. pants or a jacket).

A motion simulator with a good collision-response algorithm tries to generate motion that is devoid of intersections (motions of objects through other objects). Unfortunately, this may not always be possible, and the simulator must be prepared to deal with intersections if they occur. Simulated clothing for example, should not self-intersect as it wrinkles and folds. However, no prior art collision-response algorithm for cloth is perfect; the cloth will sometimes self-intersect despite a simulator's best efforts. When this happens, it is vital for the motion simulation algorithm to analyze and understand the nature of the intersection and then generate a response that quickly removes the intersection. The end result is an intersection that is limited to a hopefully tolerable duration.

Intersections also occur that are inherently unavoidable: it is common for animators to pose characters so that they self-intersect. For example, a character crossing her arms over her torso may actually have the arm penetrating into the torso to achieve a tight pose, as illustrated in FIG. 1. This self-intersection occurs for two main reasons. First, the animator may be unaware that intersection has occurred, because the intersection may not be visible from the virtual camera the animator uses to view the scene. Second, limitations in the controls for posing the character may force the animator into using poses that result in self-intersection, to achieve the desired look.

When this happens, the animator will arrange the characters so that the necessary self-intersections are not visible from the camera's point of view (contrast FIG. 1a with FIG. 1b). However, if the character is wearing simulated clothing, the character's self-intersections force the simulated clothing, which is caught between intersecting body parts, to intersect both itself and the character. This is a serious problem for the motion simulation program which must choose a best-course action which yields reasonable motion behavior for the simulated clothing, even in the presence of potentially large intersections.

The prior art systems fail to adequately solve such problems. As a result, if the simulated object's motion behavior is not reasonable, then these undesirable results must be corrected by the animator directly. In such cases, the simulator, designed to ease the burden on the animator by having associated objects react to the motion of the character automatically, places the burden back on the animator to correct for the improper results. As such, there is a need in the prior art to have improved processes that allow the for proper simulation of computer-displayed objects even in the face of intersections between the objects.

There have been attempts to do the type of analysis needed to address the above-noted problems. In particular, "Versatile and Efficient Techniques for Simulating Cloth and Other Deformable Objects", P. Volino et al., Computer Graphics, SIGGRAPH'95 proc., pp. 137–144, 1995, details a method for detecting self collisions and determining the inside-outside orientation in those collisions.

However, this work has several drawbacks as discussed below. First, the method depends heavily on "history." In other words, at time to, the method uses information about the cloth positions at times $t<t_0$ (i.e. the "past") to make decisions about what to do at time $t_0$. In particular, the assumption is made that past states are always correct, so that if a cloth particle was above a cloth surface in the past, but is now below it, then being above is the correct state, and being below it is wrong.

In addition, in section 3.2.1 of the above-cited paper, the authors also attempt to examine the cloth in a small neighborhood near the intersection of an edge through a face, as a part of the method. The system takes a majority vote to determine which side is the correct side for the cloth to be on. However, this is a local examination, not a global one. Thus intersections outside of this small neighborhood are not considered. Additionally, the method of the cited paper relies only on statistics; their method forces the cloth to choose "yes, I'm right" or "no, I should be on the other side." Such a system allows each portion of the cloth to have an equal weight and thus the portions that have the "wrong" orientation effect the determination as much as those portions that have the "correct" orientation.

SUMMARY OF THE INVENTION

The present invention is directed to methods for analyzing intersections between objects, as well as applications of this analysis. The methods in this application can be collectively referred to as global intersection analysis (GIA). The information provided by GIA can be used to more realistically simulate the motion of objects in response to collisions with other objects. The information provided by GIA can also be used to provide feedback to an animator on when objects intersect.

The present invention is directed to a method of analyzing intersections between objects in computer animation. A plurality of objects represented by a plurality of meshes are provided, with each of the plurality of objects being represented by one of the plurality of meshes and each of the meshes being formed by a set of vertices, where pairs of vertices of the set define edges. All edges of the meshes are checked to determine if the edges of the meshes intersect with any of the plurality of meshes and an intersection path is traced where the intersection path is formed by intersection of the edges with any of the plurality of meshes. The vertices of the meshes that are contained within said intersection path are determined and a polarity of each of the contained vertices are set to indicate that those vertices are contained within the intersection path.

The method is applicable to determining which vertices of the meshes are contained within said intersection path by examining the vertices of a mesh that contains the intersection path within a certain distance from a particular edge of the intersection path and characterizing the vertices to determine which vertices of the meshes are contained within the intersection path.

With respect to determining which vertices of the meshes are contained within the intersection path, the method further includes selecting an arbitrary edge of a mesh that crosses the intersection path, where the arbitrary edge is formed by vertices u and v and where the mesh contains the intersection path. A search of the mesh is performed, radiating from one of the vertices u and v, identifying all vertices in all of the edges that cross the intersection path, and the set of vertices identified as a playpen is defined. The intersection path is traced and vertices identified, within the playpen, on a left side of the intersection path as left and retracing the intersection path in an opposite direction and identifying vertices, with the playpen, on a right side of the intersection path as right. Vertices adjacent to vertices identified as left and right lie are examined to determine if they lie outside of said playpen. The intersection path is discarded when at least one of both left and right identified vertices lie outside the playpen. Otherwise, if at least one vertex adjacent to the right identified vertices lies outside the playpen, then the polarity of each of the left identified vertices is set to indicate that those vertices are contained within the intersection path. Otherwise, the polarity of each of the right identified vertices are set to indicate that those vertices are contained within the intersection path when at least one vertex adjacent to the left identified vertices lies outside the playpen.

When the intersection path is a self-intersection of a single connected region of one mesh with itself then the polarity of each of said contained vertices is set to indicate that those vertices are contained within said intersection path by setting the color of the vertices are contained within the intersection path to a predetermined color. When the intersection path is an intersection between a first mesh and a second mesh, or between two unconnected regions of the same mesh, then the color of the vertices of the first mesh or first region contained within the intersection path is set to a first color and the color of vertices of the second mesh or second region contained within the intersection path is set to a second color. In addition, the above colors can be displayed in the objects on a computer display with vertices colored as the vertices have been set to serve as a guide for the animator.

In addition, a method of determining pinching between objects in computer animation is also disclosed. A plurality of objects represented by a plurality of meshes are provided, with each of the plurality of objects being represented by one of the plurality of meshes and each of the meshes being formed by a set of vertices. Intersections between the objects are analyzed and a polarity of each of a plurality vertices, contained in an intersection path created by an intersection of said plurality of meshes, is set. A particular vertex of said set of vertices bound between surfaces of said objects and closer to one of said surfaces is selected, where the surfaces have defined insides and outsides and said particular vertex is inside of both surfaces. A determination is made of whether any vertices inside of the surfaces have their polarities set and an indication that the particular vertex is pinched is made when any vertices inside of said surfaces have their polarities set.

Once the pinching of a vertex is determined, the motion of the pinched vertex is constrained when the motion in the computer animation is simulated. In addition, the color of each of a plurality of vertices, contained in an intersection path, are set and the objects are displayed on a computer display with vertices colored as the vertices have been set such that an animator can see the intersection and pinching of the objects.

The present invention is also directed to a method of simulating motion of objects in computer animation. A plurality of objects are presented, represented by a plurality of meshes, with each of the plurality of objects being represented by one of the plurality of meshes and each of the meshes being formed by a set of vertices, where at least one of the objects is an animated object and at least one of the objects is a simulated object. The objects are positioned at some time t to provide one frame of computer animation and intersections between the objects are analyzed and the polarity of each of a plurality vertices contained in an intersection path created by an intersection of said plurality of meshes is set. A simulated force between vertices of the at least one simulated object based on the polarity set for the vertices of the at least one simulated object and the computer animation is advanced to a time t+Δt and motions of the objects are simulated using the simulated force to simulate motions of the at least one simulated object.

When the intersection path is a self-intersection of a single connected region of one mesh with itself, then the the color of each of the plurality vertices is set to a predetermined color and when the intersection path is an intersection between a first mesh and a second mesh, or between two unconnected regions of the same mesh, then the color of each of said plurality vertices of the first mesh or first region is set to a first color and the color of each of said plurality vertices of the second mesh or second region is set to a second color.

In addition, the simulated force is set to cause an attraction between vertices of the at least one simulated object when the vertices are set to the first or second colors; the simulated force is set to cause an repulsion between vertices of the at least one simulated object when the vertices are not set to the first, second, or predetermined colors and the simulated force is set to cause neither attraction or repulsion between vertices of the at least one simulated object when the vertices are set to the predetermined color.

The above and other objects, features and advantages of the invention will become apparent from the following description of the preferred embodiment taken in conjunction with the accompanying drawings.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 1 illustrates a kinematic character in a tight pose.

FIG. 7a illustrates a non-simple intersection path that does not define an interior. FIG. 7b illustrates a non-simple intersection path that does define an interior. FIG. 7c. illustrates the use of a "playpen" surrounding an intersection path.

FIG. 8a is a schematic illustrating a vertex x that is interior with respect to surfaces A and B, both of which have defined insides and outsides. FIG. 8b illustrates the vertex x being pinched between surfaces A and B. FIG. 8c illustrates the vertex x in a region where the surface normal varies rapidly.

DESCRIPTION OF THE PREFERRED EMBODIMENTS

The present invention is directed to methods for analyzing intersections between objects, as well as applications of this analysis. The needed analysis must be global in nature; examination of geometry in the vicinity of an intersection (that is, local analysis) does not completely describe the nature of the intersections. Accordingly, the methods of the present invention constitute a global intersection analysis.

The intersections analyzed herein involve either intersections of a surface (strictly speaking, a 2-manifold) with itself or another surface. The case of a curve intersecting a surface (which is applicable when colliding hair or fur with a character's skin) is trivially handled by the methods described. It is noted that the cases of intersection of meshes at a point or by intersection of a whole plane are not addressed herein and do not occur in the normal process of computer animation. Such intersections do not occur because random noise is added to the meshes so that the chances of intersections occurring where an intersection path is not formed are infinitesimal.

Figure 2B:
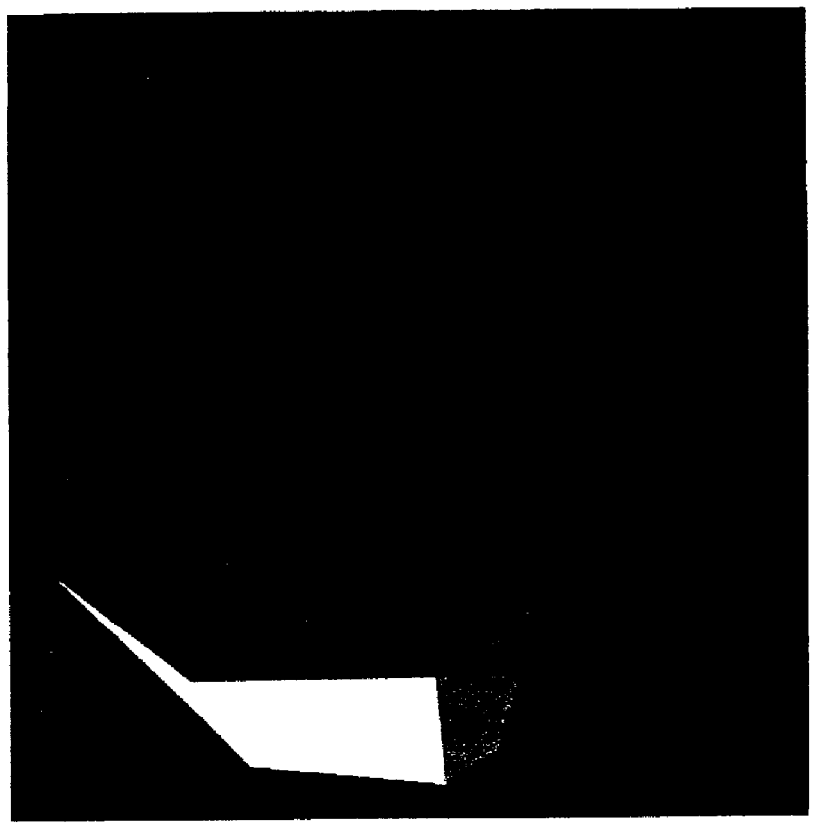
FIG. 2b illustrates an intersection between two meshes, with an intersection curve marked in red.
Figure 2A:
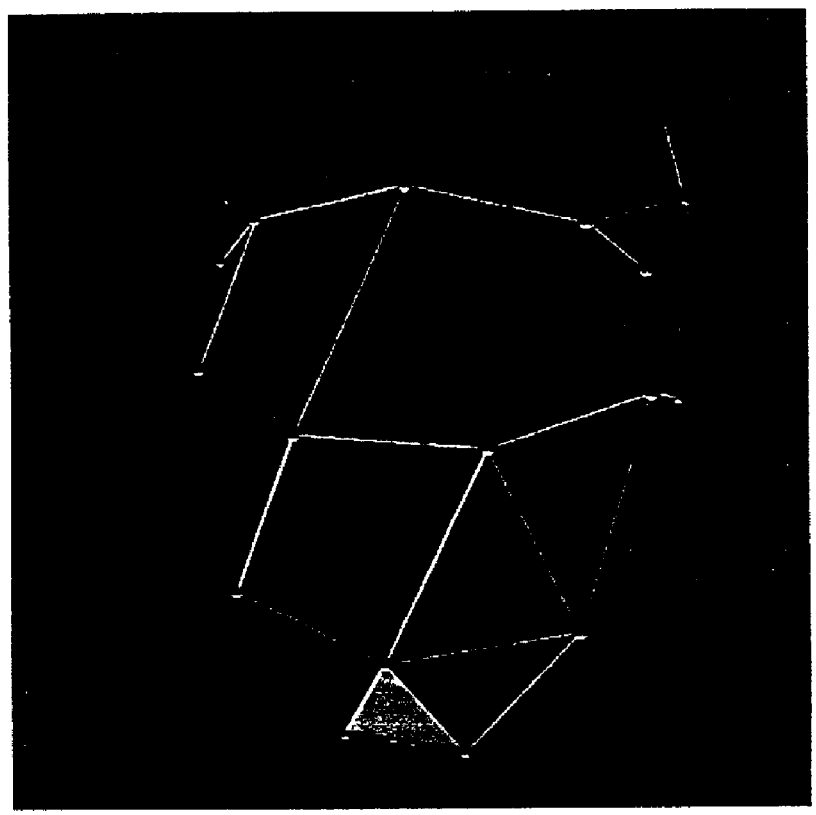
FIG. 2a illustrates a coarse triangular mesh, with vertices and edges marked in yellow and white, respectively.

In the context of the present application, kinematic (i.e. non-simulated objects) and dynamic objects (i.e. simulation objects), or elements, can be, in the preferred embodiments, collections of data points having connections between the data points or vertices. These collections of data points form triangular meshes that are used to form elements of computer animation images. FIG. 2a shows a low resolution triangular mesh. In FIG. 2b, two meshes are positioned so that they intersect one another. The intersection curve between the two meshes is marked in red. Note that this "curve" actually consists of a number of straight line segments. This follows from the fact that the intersection between a pair of triangles (if it exists) is just a single straight segment. To emphasize that the intersection curve is easily describe by finitely many line segments, the present application will use instead the term intersection path.

Through manipulation of the data points or vertices, or collections thereof, the images are changed on a per frame basis to simulate motion. The kinematic objects described herein are preferably characters that are animated and interact with other elements in the animation scene. The simulated objects are objects that are associated with the kinematic objects. In the case when the kinematic object is an animated character, the dynamic objects are attributes of that character, such as hair and/or clothing. Both kinematic and simulated objects are defined by the above meshes.

Figure 3B:
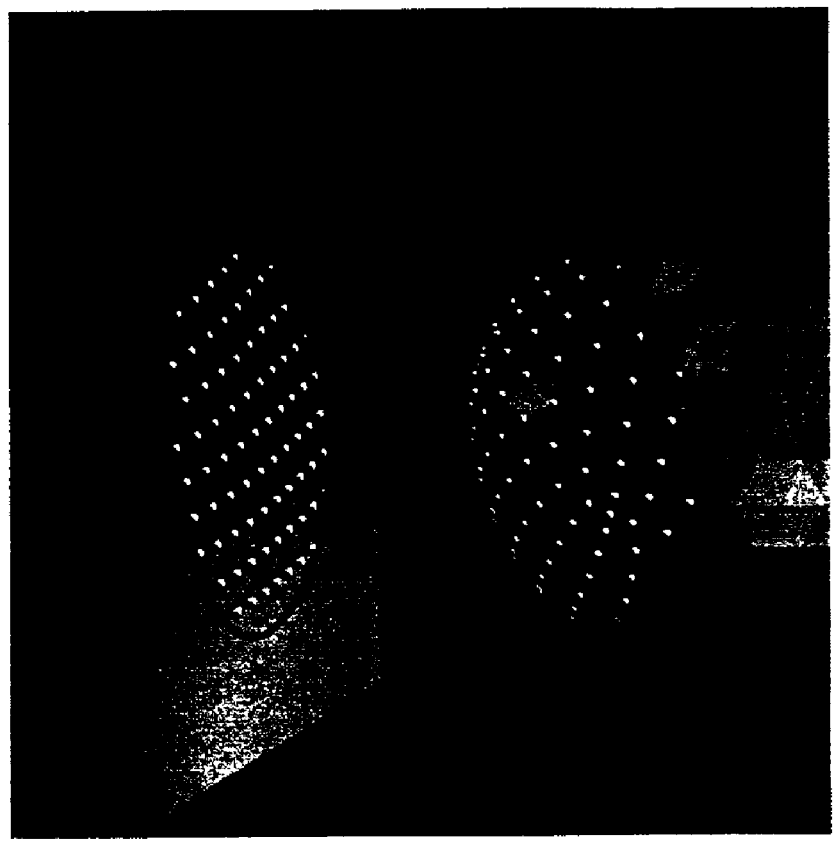
FIG. 3b shows FIG. 3a in an exploded view.
Figure 3A:
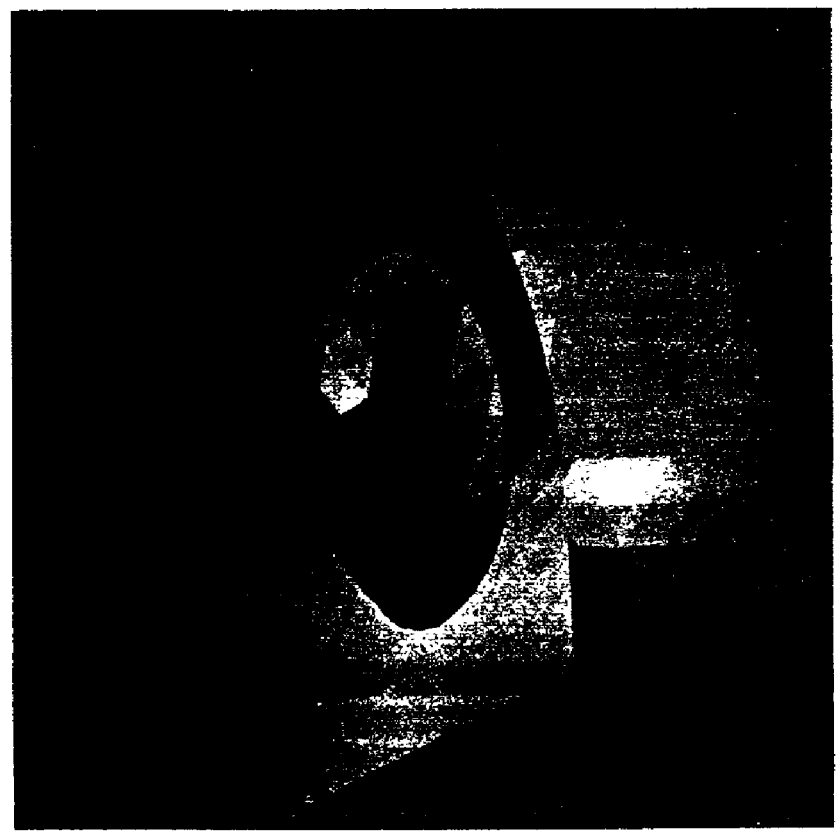
FIG. 3a is a schematic illustrating intersecting meshes with intersection path marked in red.
Figure 4B:
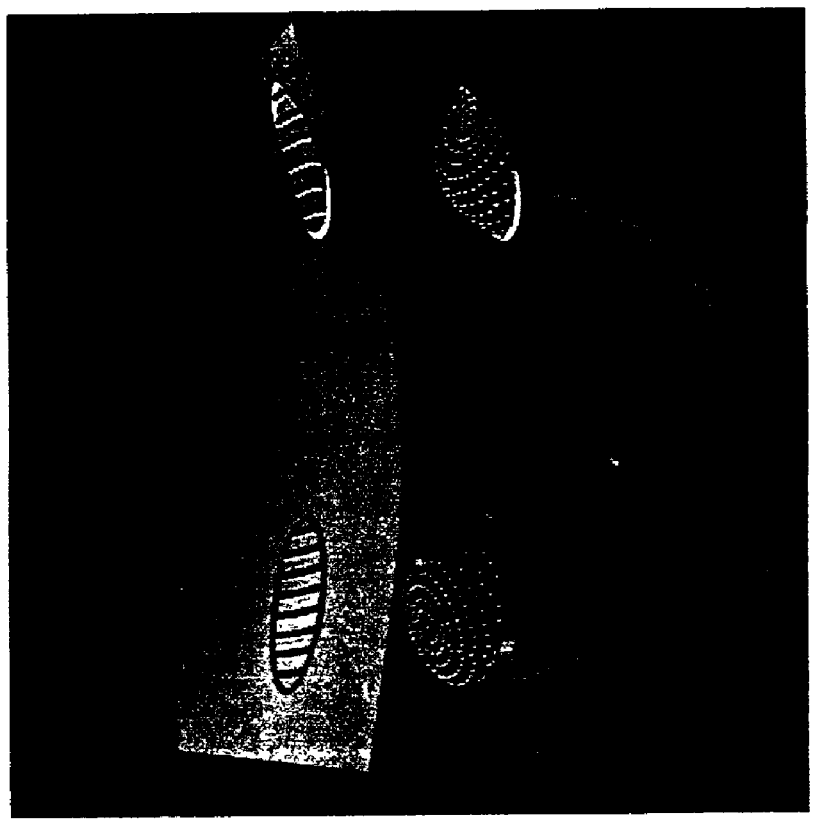
FIG. 4b shows FIG. 4a in an exploded view.
Figure 4A:
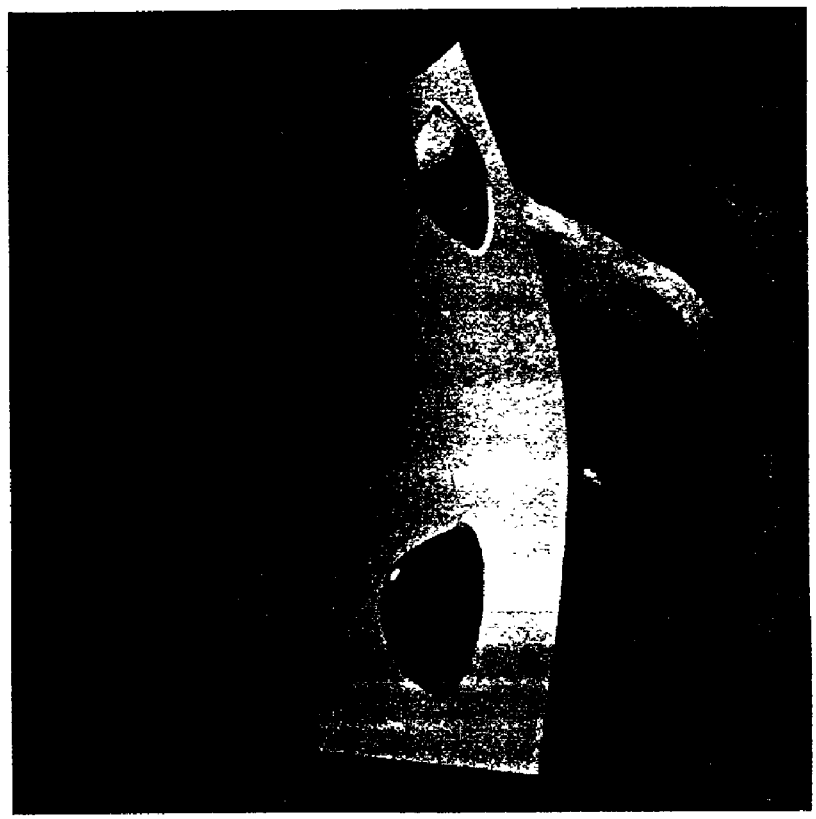
FIG. 4a is a schematic illustrating two separate intersections between two meshes.
Figure 5B:
FIG. 5b shows FIG. 5a with the surface mesh being unbent so that two distinct intersection paths can be seen.
Figure 5A:
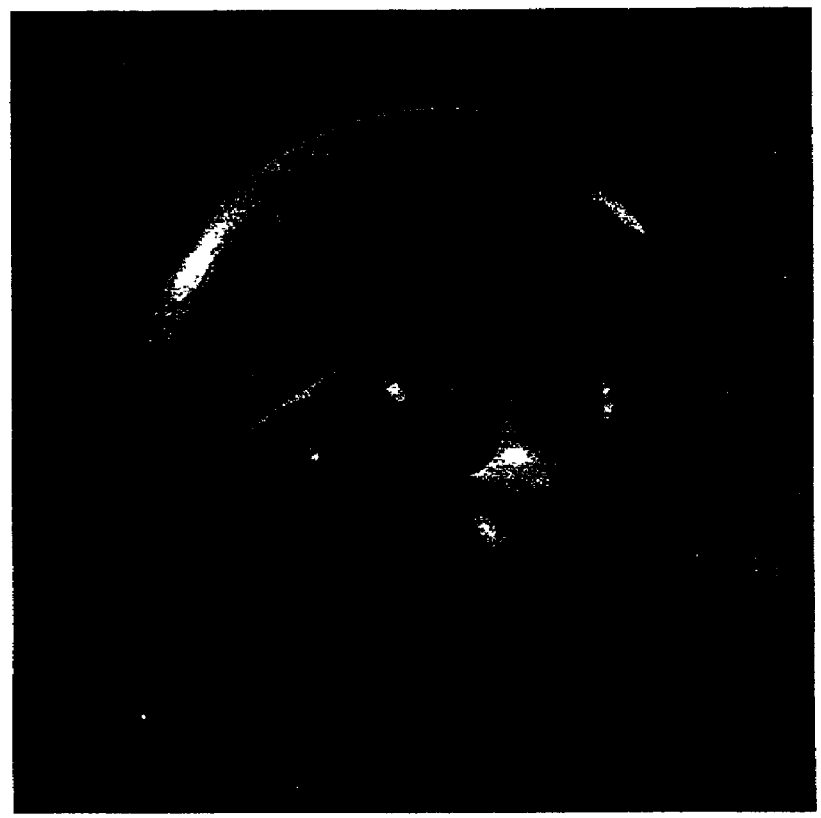
FIG. 5a is a schematic illustrating a self-intersection of one mesh with itself, with the intersection occurring between two different regions of the mesh.
Figure 6B:
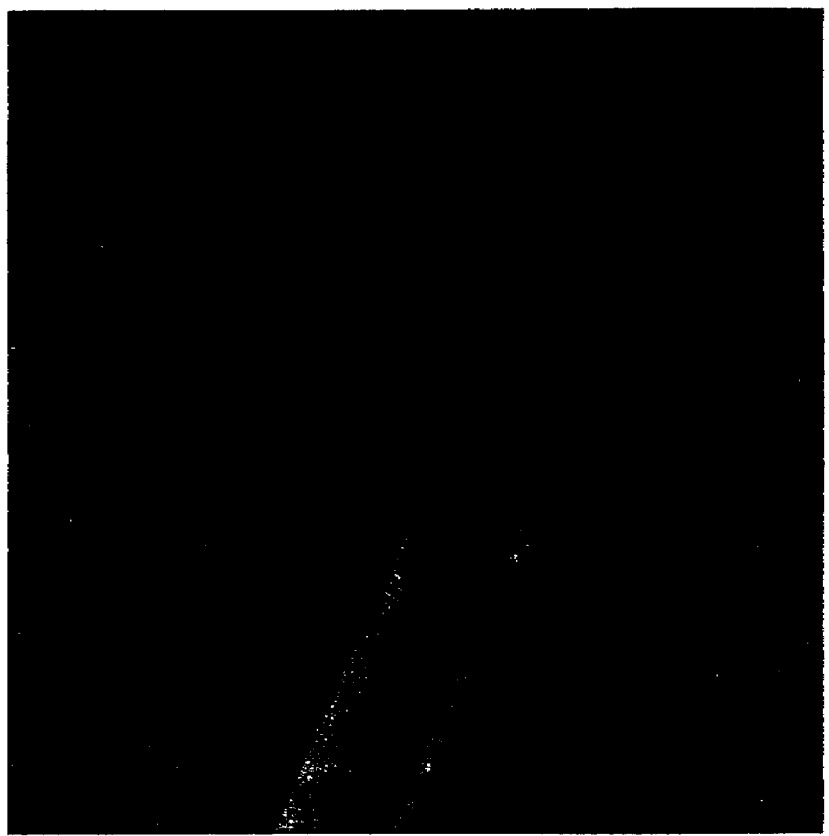
FIG. 6b shows FIG. 6a with the arm unbent to better illustrate the single intersection path.
Figure 6A:
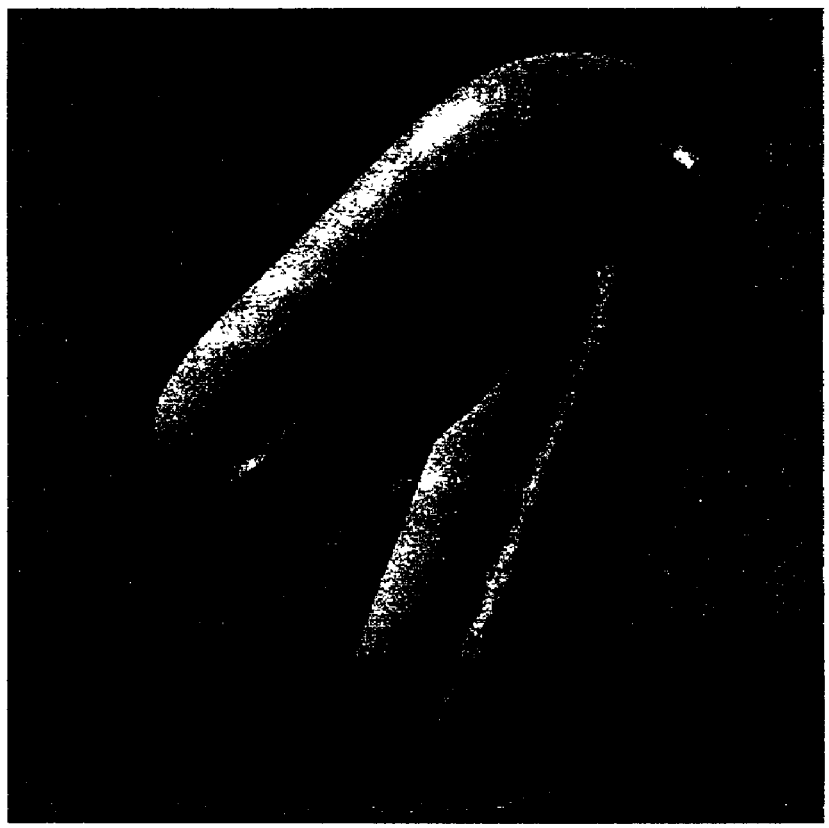
FIG. 6a is a schematic illustrating a self-intersection of single mesh formed by severely bent "arm".

A pair of surfaces may intersect in several manners. The surfaces may not intersect, the surfaces may intersect once, as shown in FIG. 3, or they may intersect multiple times, as shown in FIG. 4. A surface may also intersect itself; however, self-intersections come in two very different forms. The self-intersection may result in two closed intersection paths, as sown in FIG. 5. This occurs when the surface deforms so that two distinct regions of the one surface intersect. In contrast, FIG. 6 shows a self-intersection that results on only one closed intersection path. In this case, the surface has deformed so that a single region has been folded on top of itself.

With the above in mind, a pair of meshes $M_1$ and $M_2$ are analyzed for intersections as follows. It is noted that when $M_1=M_2$, a mesh is being checked for self-intersections as shown in FIG. 5 or FIG. 6.

1. All triangle edges of mesh $M_1$ are checked to see if they intersect any triangle faces of $M_2$ and vice versa.

2. If some edge/face intersections are found, one or more intersection paths exist. An intersection path is traced by starting at an arbitrary edge/face intersection, following the path to the next edge/face intersection, and continuing this process in a consistent direction until one arrives back at the initial edge/face intersection. Each edge/face intersection encountered during this tracing is marked as having been used in a path. When all edge/face intersections have been used in a path, all paths have been found.

3. For each intersection path found, the mesh vertices that are surrounded by the intersection path (i.e. those vertices lying "inside" the path) are given a color. Suppose that the ith intersection path is being examined. If an intersection path arises from a situation as depicted in either FIG. 3b or FIG. 5b, then there are two such regions. Arbitrarily, the vertices in one region are assigned the "color" $black_i$ and the vertices in the other region are given the color $white_i$. If the intersection is a self-intersection that yields only a single region, as in FIG. 6, then all the vertices in that one region are marked as having color $red_i$. A vertex is allowed to have an arbitrary number of colors. While the use of "colors" is discussed herein, the present invention is not so limited and the "polarity" of each of the vertices in question can be set in a myriad of different ways as long as the differences between the vertices can be distinguished.

The computational methods required to implement the above steps are all straightforward, except for the step of determining which vertices lie on the "inside" of a path, versus those which lie "outside" the path. First, it is noted that it is not clear what the "inside" versus the "outside" of an intersection paths is. Are the vertices on the blue mesh in FIG. 3b really the "inside" of the intersection path? It is just as valid to say that the uncolored vertices on the blue surface are surrounded by the intersection path. Second, an intersection path may intersect itself, as shown in FIGS. 7a and 7B (or even worse). Such non-simple paths may or may not define an inside and an outside set of vertices.

The following analysis identifies which vertices are on the inside of an intersection path as follows.

1. An arbitrary edge in the mesh is picked that is crossed by the intersection path, such as the edge between vertices u and v in FIG. 7c. A breadth-first search is performed, starting at one of the vertices in the edge (vertex u in FIG. 7c). The breadth-first search terminates after it reaches all vertices in all edges that cross the intersection path. Because a breadth-first search emanates from its starting point in a roughly circular fashion, the end result is that the process marks a single connected and roughly circular region of vertices (the gray region in FIG. 7c) that contains all of the intersection path. This set of vertices reached by this search is referred to as the "playpen." The intersection path lies completely within the playpen.

2. After marking the playpen, the intersection path is followed and a flood-fill (either by breadth-first or depth-first search) is performed that does not either (a) leave the playpen or (b) cross over the intersection path. Vertices are consistently filled on one side of the path (say the left), and all such vertices found are marked as "left" vertices. The intersection path is rewalked, but is now started with the flood-fill on the right side of the path and the vertices found are marked as "right" vertices.

3. If flood-fills from both the left side and the right side of the path could reach out of the playpen, then the path must intersect itself in the manner of the figure-8 path shown in FIG. 7a; this sort of intersection path does not properly define an "inside" set of vertices and the path is discarded.

4. Otherwise, say a seed-fill from only the right side could reach out of the playpen. In this case, a seed-fill from the right side of the path would (had the playpen not been present) have continued to mark all vertices in the mesh except those surrounded by the intersection path. In this case, it is the left vertices that are on the interior of the inside path, for they cannot cross over the intersection path to reach outside the playpen. Accordingly, the left vertices are declared to be the interior of the region.

5. By symmetry, if only a seed-fill from the left could reach out of the playpen, the right vertices are declared to be the interior of the path.

Two features of the use of the playpen in the above algorithm are noted. First, it allows non-simple paths to be dealt with, such as shown in FIG. 7a, without forcing us to discard all such paths. Given the above rules, the figure-8 path in FIG. 7a is discarded, but the non-simple path in FIG. 7b defines an interior set of vertices (the arrows point to the interior). Second, the playpen vastly speeds up the algorithm for simple paths. To see this, imagine a circular path of diameter 10 miles drawn on the Earth's surface. The playpen around this path will have a diameter of approximately 20 miles. Seed-fills from one side stay within the 10 mile circle. Seed fills from the other side stay within the 20 mile circle that is the playpen. In neither case does the process need to cover the entire Earth's surface in determining inside from outside. This is because reaching to the edge of the playpen tells you that you can cover all the rest of the surface, without having to actually perform this exploration.

Two applications of GIA are discussed below. The first involves using information provided by GIA to more realistically simulate the motion of objects in response to collisions with other objects. The basic steps of using GIA for motion simulation are as follows: beginning at some initial time t, 1. Perform GIA on all pairs of animated surfaces (i.e. surfaces whose motion is predetermined) at time t.

2. Perform GIA on all pairs of simulated surfaces (i.e. surfaces whose motion is computed by the simulation program) at time t.

3. Determine the response of simulated objects at time t in response to collisions with both animated objects and other simulated objects, making use of the knowledge from steps 1 and 2.

4. Advance the state of the system to a later time t+Δt and return to step 1.

Figure 1B:
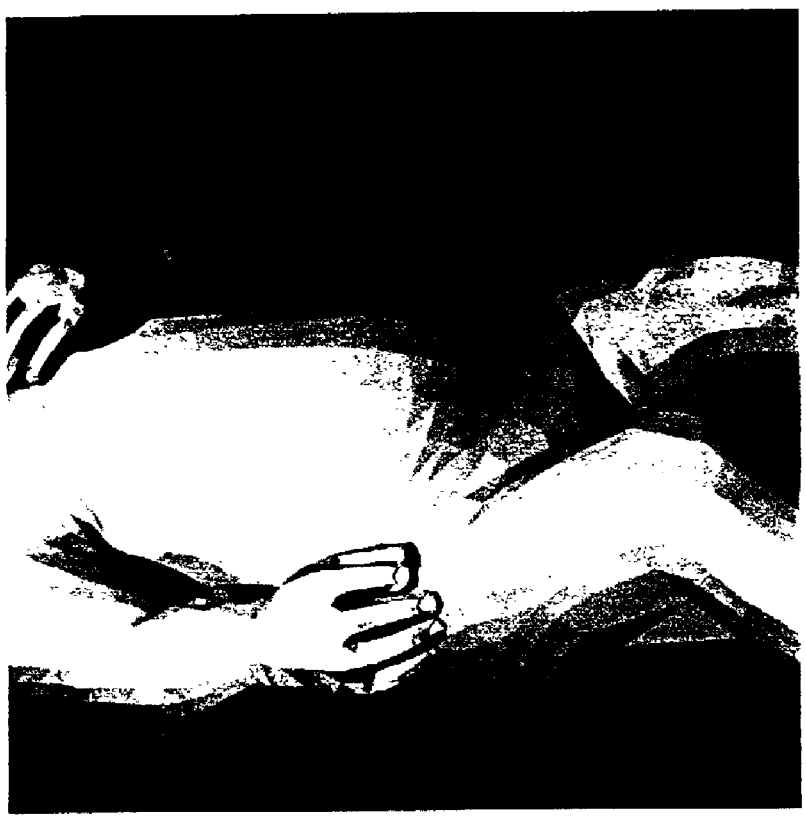
FIG. 1b presents the illustration of FIG. 1a from a more revealing viewpoint showing a sharp intersection of the character's left forearm with the torso.
Figure 1A:
FIG. 1a is an illustration of a kinematic character from the viewpoint of the virtual camera.

Motion simulation programs exploit the data obtained from GIA in two major capacities. The first is in pinch detection. Hand-animated characters wearing clothes can easily "pinch" the cloth: arms can be drawn in against the body (FIG. 1), hands can rest on legs, elbows (FIG. 6) can be bend sharply, etc. Geometrically, pinching occurs when two surfaces are very near one another yet have radically different ideas about which direction "inside" is.

Unfortunately, any sort of bump in the character's skin, or "thin" feature, such as a finger, involves some portion of the skin surface being near another portion, with each surface's inward direction being nearly opposite. Yet cloth or hair that merely touches a finger, or slides over a bump in the skin is only slightly constrained, while cloth or hair in the crook of an elbow may be completely immobilized. The vertex coloring performed by the analysis step gives a simple way of distinguishing between these two cases.

Suppose vertex x is being simulated, and suppose surfaces A and B have well-defined insides and outsides, as shown in FIG. 8a. Suppose vertex x is found to be inside both of A and B, although much closer to the surface of A than to the surface of B. If one vertex from surface A has been colored black$_j$ and a vertex from surface B has been colored white$_j$ (or vice versa) or if two vertices on A and B have been colored red$_i$ for some i, then the two surfaces have intersected in the neighborhood of x. The situation is then as shown in FIG. 8a, with vertex x is being pinched between two intersecting surfaces A and B. In this case, x's response to the collision should take into account that it is quite immobilized between these two surfaces.

However, if there are no black/white or red pairs of vertices between the two surfaces, then the situation is as that shown in FIG. 8c. Here, the vertex x is merely in contact with a surface whose surface normal varies rapidly. There is no reason to regard x as being pinched.

Motion simulation programs can also exploit the data obtained from GIA in analyzing unoriented collision surfaces. Sometimes surfaces encountered during simulation are unoriented; it is legal for other objects to be on either side of an unoriented surface as long as they do not intersect it. In contrast, an oriented surface explicitly defines an "inside" region; objects should always be ejected from this interior region if they manage to get inside.

Cloth is an example of an unoriented surface, and cloth-to-cloth collision response (either between two different pieces of cloth or between a single piece of cloth and itself) is notoriously difficult. One simple rule is for every cloth vertex to repel from all other cloth vertices within some limited neighborhood. This rule works as long as the cloth always stays in a non-intersecting configuration. As discussed above, this is, practically speaking, impossible. Once the cloth has intersected, the simple repulsion rule tries to maintain the intersection, because it does not understand that portions of the cloth may need to pass back through each other for the cloth to untangle.

This simple-minded rule can be modified using the data from GIA as follows. Given a pair of cloth vertices which are candidates to repel one another, the following possibilities can be examined.

1. If for some i one vertex has been colored black$_i$ and the other white$_i$ then GIA has detected that the two vertices inhabit cloth regions that intersected one another. The repulsion is changed to an attraction, to pull the cloth back through itself in this neighborhood and remove the intersection.

2. If for some i both vertices have color reds (which means both vertices are on the same piece of cloth) then the two vertices are in a region which has self-intersected in the manner of FIG. 6. Neither attraction nor repulsion is applied (either is likely to be incorrect)—instead, this section of the cloth is free to move through itself in any manner. Typically other sections of the cloth which do not fall into this category will move to pull the cloth back apart.

3. If none of the above hold, the cloth vertices inhabit regions which have not intersected (each other). The normal repulsive behavior is applied. The above repulsion/attraction rules can be applied whenever surfaces are unoriented and at least of the surfaces is simulated.

The information provided by GIA can also be used to provide feedback to an animator on when objects intersect. A graphical display of the intersection regions as determined by GIA provides useful feedback during the animation process. Possibilities include drawing the characters in some transparent or wire-frame mode, in conjunction with displaying the intersection data. This lets the animator immediately react to and understand the amount of intersection caused by a particular pose.

As such, the present invention provides for a great improvement over the prior art methods. As opposed to the prior art methods discussed above, the methods of the present invention make no use of "history." The use of past positions and orientations is often faulty because sometimes the system does not have a correct history to work with (i.e. the very first starting position of the cloth has intersections in it). In addition, if mistakes occur, then with a history method, the mistaken analysis is viewed as correct, and faulty analysis will continue to propagate (i.e. the cloth will stay tangled up). The system of the present invention avoids this problem by not relying on history in performing the global intersection analysis.

Also, unlike the prior art systems, the analysis used in the present invention is global. The prior art method, discussed above, forces the cloth to choose "yes, I'm right" or "no, I should be on the other side." In contrast, the present invention adds a third state, sort of "I am sure I am confused," which allows portions of the cloth to, in effect, abstain, and allows other portions which are more sure they know what to do to make the decisions. Thus, by performing a global analysis and allowing analyzed portions more freedom in determining if they have the correct orientation, a few portions having an incorrect orientation do not skew the proper result.

The intersection data can also be interactively recomputed and displayed as the animator adjusts the character's pose. Of course, the data from GIA can be saved and redisplayed at a later time as well. This application is useful not only in computer animation, but more generally in any sort of computer-aided design and manufacturing programs, tools, or applications.

Figure 9:
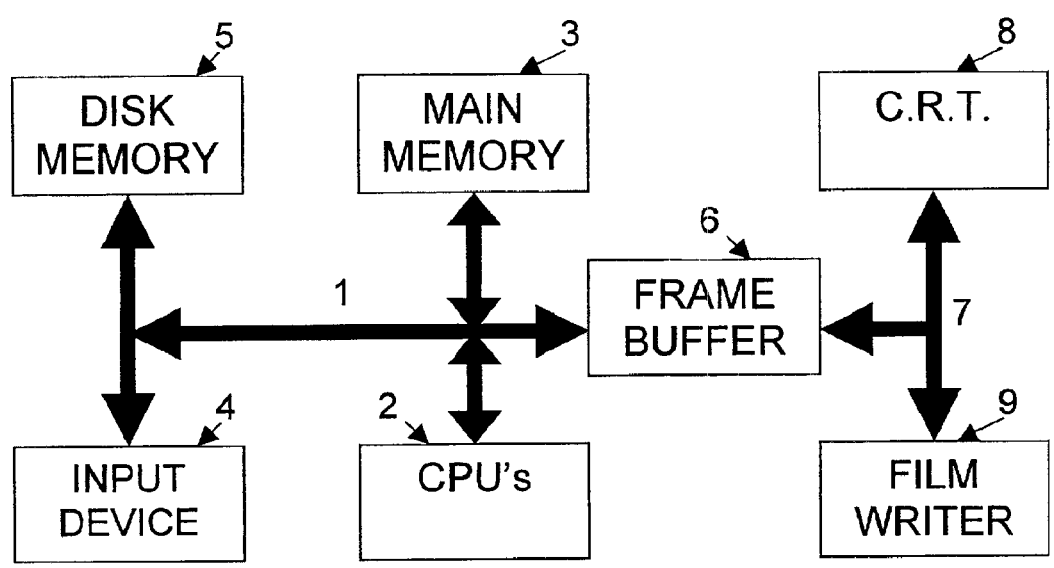
FIG. 9 is a schematic showing a computer system that can be used to create, store and record computer animation.

FIG. 9 illustrates an exemplary computer system that can be used for carrying out the invention. A main bus 1 is connected to one or more CPUs 2 and a main memory 3. Also, connected to the bus are an input device 4 and a disk memory 5. The frame buffer 6 receives output information from the main bus and sends it through another bus 7 to either a CRT 8 or some other peripheral that writes the image directly onto film 9. The computer system is used to perform the global intersection analysis of the present invention and to simulate objects reacting to collisions and intersections with other objects.

Figure 10:
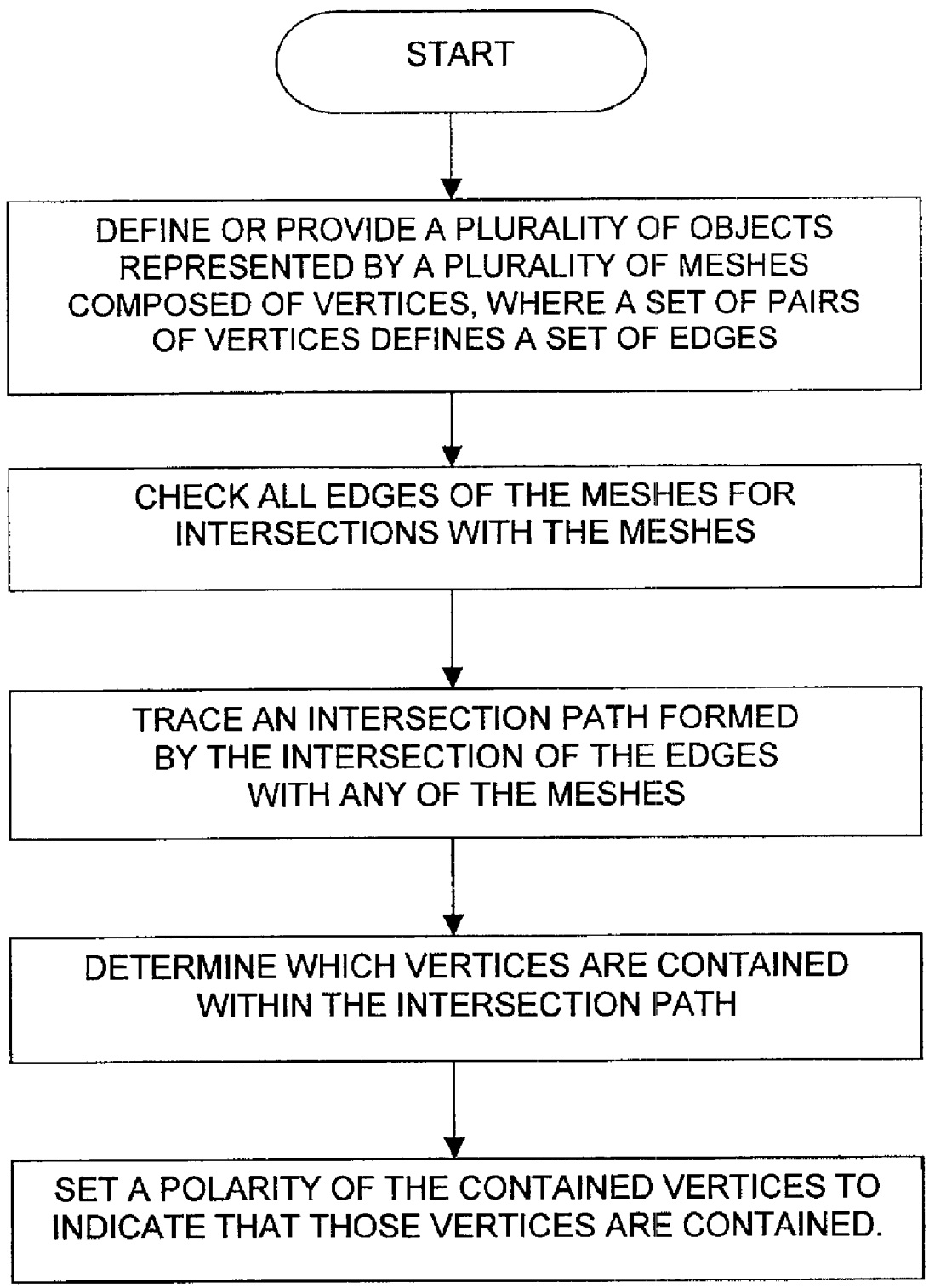
FIG. 10 is a flow chart illustrating the steps of one embodiment of the present invention.

A method according to one embodiment of the present invention is illustrated in a flow chart provided in FIG. 10. First, objects of the computer animation are determined or presented, with each of the objects being represented by meshes made up of sets of vertices. The vertices of the meshes define edges and all of those edges are checked at a point in time to determine if they intersect with any of the meshes. An intersection path is formed by tracing the intersection of the edges with the meshes. Next, a determination of which vertices of a mesh lie within the intersection path are determined. Finally, the polarity of the "contained" vertices are set to a certain value so that their status can be easily utilized and tracked.

Global intersection analysis lets a simulation system robustly deal with many different types of intersections. The analysis forms the backbone of a collision-response algorithm for unoriented objects such as cloth that is immeasurably better than any previous existing algorithm. The analysis also allows objects to be simulated even when hand-animated elements of the simulation have extreme amounts of interpenetration. Finally, simply displaying the nature and extent of the data found from GIA provides extremely useful feedback to an end-user.

Although embodiments of the present invention have been described in detail, it will be understood that the present invention is not limited to the above-described embodiments, and various modifications in design may be made without departing from the spirit and scope of the invention defined in claims.

What is claimed is:

1. A method of analyzing intersections between objects in computer animation comprising:
    providing a plurality of objects represented by a plurality of meshes, with each of said plurality of objects being represented by one of said plurality of meshes and each of said meshes being formed by a set of vertices, where a set of pairs of vertices of said set of vertices define a set of edges;
    checking all edges of said meshes to determine if said set of edges of said meshes intersect with any of said plurality of meshes;
    tracing an intersection path formed by intersection of said edges with any of said plurality of meshes;
    determining which vertices of said meshes are contained within said intersection path; and
    setting a polarity of each vertex contained within said intersection path to indicate that said vertex is contained within said intersection path, wherein a polarity of a vertex is set based upon a number of disconnected regions formed by said intersection path.

2. The method of claim 1 wherein determining said intersection path is a self-intersection with the intersection path being contained in a single mesh and wherein setting a polarity of each vertex comprises:

associating a first color with each vertex that is contained within said intersection path when the intersection yields one region; and when the intersection yields first add second disconnected regions, associating a second color with each vertex contained in said first disconnected region and associating a third color with each vertex contained in the second disconnected region.

3. The method of claim 1 wherein said intersection path is an intersection between a first mesh and a second mesh and wherein setting a polarity of each vertex comprises associating a first color with vertices of the first mesh contained within said intersection path and associating a second color with vertices of the second mesh contained within said intersection path.

4. The method of claim 2, further comprising displaying said objects on a computer display with vertices displayed in colors associated with the vertices.

5. A method of simulating motion of objects in computer animation, the method comprising:

providing a plurality of objects represented by a plurality of meshes, with each of said plurality of objects being represented by one of said plurality of meshes and each of said meshes being formed by a set of vertices, where at least one of said objects is an animated object and at least one of said objects is a simulated object;

positioning said objects at some time t to provide one frame of said computer animation;

determining an intersection path formed by intersections between said objects;

setting a polarity of each vertex contained within said intersection path based upon a number of disconnected regions formed by said intersection path, wherein setting the polarity comprises;

when said intersection path is a self-intersection with the intersection path contained in a single mesh,
associating a first color with each vertex contained within said intersection path when the intersection yields one region, and when the intersection yields first and second disconnect regions, associating a second color with each vertex contained in said first disconnect regions and a third color with each vertex contained in the second disconnected region; and when said intersection path is an intersection between a first mesh and a second mesh, associating the second color with each vertex of the first mesh contained within said intersection path and associating a third color with each vertex of the second mesh contained within said intersection path;

setting a simulated force between vertices of said at least one simulated object based on the polarity set for said vertices of said at least one simulated object, wherein setting the simulated force comprises:

setting said simulated force to cause an attraction between vertices of said at least one simulated object when said vertices are associated with said second or third colors;

setting said simulated force to cause a repulsion between vertices of said at least one simulated object when said vertices are not associated with said first color, said second color, or said third color; and setting said simulated force to cause neither an attraction or a repulsion between vertices of said at least one simulated object when said vertices are associated with said first color; and advancing the computer animation to a time t+Δt and simulating motions of said objects using said simulated force to simulate motions of said at least one simulated object.

6. A computer program product stored on a computer readable medium for processing computer generated objects, said computer program product comprising:

code for providing a plurality of objects represented by a plurality of meshes, with each of said plurality of objects being represented by one of said plurality of meshes and each of said meshes being formed by a set of vertices, where a set of pairs of vertices of said set of vertices define a set of edges;

code for checking all edges of said meshes to determine if said set of edges of said meshes intersect with any of said plurality of meshes;

code for tracing an intersection path formed by intersection of said edges with any of said plurality of meshes; and code for determining which vertices of said meshes are contained within said intersection path, the code for determining comprising;

code for selecting an arbitrary edge of a mesh that crosses said intersection path, where said arbitrary edge is formed by vertices u and v and where said mesh contains said intersection path;

code for performing a search of said mesh, radiating from one of said vertices u and v, identifying all vertices in all of said edges that cross said intersection path, and defining the set of vertices identified as a playpen;

code for tracing said intersection path and identifying vertices, within said playpen, on a left side of said intersection path as left and retracing said intersection path in an opposite direction and identifying vertices, with said playpen, on a right side of said intersection path as right;

code for determining whether vertices adjacent to vertices identified as left and right lie outside of said playpen;

code for discarding said intersection path when at least one of both left and right identified vertices lie outside said playpen;

code for determining whether at least one vertex adjacent to said right identified vertices lies outside said playpen; and code for characterizing each of said left identified vertices as contained within said intersection path when at least one vertex adjacent to said right identified vertices lies outside said playpen and characterizing each of said right identified vertices as contained within said intersection path when at least one vertex adjacent to said left identified vertices lies outside said playpen; and code for setting a polarity of each vertex contained within said intersection path to indicate that said vertex is contained within said intersection path, wherein a polarity of a vertex is set based upon a number of disconnected regions formed by said intersection path.

7. The computer program product of claim 6 wherein said intersection path is a self-intersection with the intersection path being contained in a single mesh and the code for setting a polarity of each vertex comprises:

code for associating a first color with each vertex that is contained within said intersection path when the intersection yields one region; and when the intersection yields first and second disconnected regions, code for associating a second color with each vertex contained in said first disconnected region and associating a third color with each vertex contained in the second disconnected region.

8. The computer program product according to claim 6 wherein said intersection path is an intersection between a first mesh and a second mesh and the code for setting a polarity of each of vertex comprises code for associating a first color with vertices of the first mesh contained within said intersection path and code for associating a second color with vertices of the second mesh contained within said intersection path.

9. The computer program product of claim 7, further comprising code for displaying said objects on a computer display with vertices displayed in colors associated with the vertices.

10. A computer program product stored on a computer readable medium for processing computer generated objects in computer animation, said computer program product comprising:

code for providing a plurality of objects represented by a plurality of meshes, with each of said plurality of objects being represented by one of said plurality of meshes and each of said meshes being formed by a set of vertices, where at least one of said objects is an animated object and at least one of said objects is a simulated object;

code for positioning said objects at some time t to provide one frame of said computer animation;

code for determining an intersection path formed by intersections between said objects;

code for setting a polarity of each vertex contained within said intersection path based upon a number of disconnected regions formed by said intersection path, wherein the code for setting a polarity of each vertex comprises;

when said intersection path is a self-intersection with the intersection path contained in a single mesh, code for associating a first color with each vertex contained within said intersection path when the intersection yields one region and when said intersection path yields first and second disconnected regions, code for associating a second color with each vertex contained in said first disconnected region and a third color with each vertex contained in the second disconnected region; and when said intersection path is formed from an intersection between a first mesh and a second mesh, the code for setting a polarity of each vertex contained in said intersection path comprises code for associating the second color with each vertex of the first mesh and associating the third color with each vertex of the second mesh;

code for setting a simulated force between vertices of said at least one simulated object based on the polarity set for said vertices of said at least one simulated object, wherein the code for setting a simulated force comprises:

code for setting said simulated force to cause attraction between vertices of said at least one simulated object when said vertices are associated with said second or third colors;

code for setting said simulated force to cause a repulsion between vertices of said at least one simulated object when said vertices are not associated with said first color, said second color, or said third color; and code for setting said simulated force to cause neither an attraction or a repulsion between vertices of said at least one simulated object when said vertices are associated with said first color; and code for advancing the computer animation to a time t+Δt and simulating motions of said objects using said simulated force to simulate motions of said at least one simulated object.

11. The method of claim 3, further comprising displaying said objects on a computer display with vertices displayed in colors associated with the vertices.

12. The computer program product of claim 8, further comprising code for displaying said objects on a computer display with vertices displayed in colors associated with the vertices.

* * * * *

UNITED STATES PATENT AND TRADEMARK OFFICE
CERTIFICATE OF CORRECTION

PATENT NO. : 6,970,171 B2  Page 1 of 2
APPLICATION NO. : 09/851940
DATED : November 29, 2005
INVENTOR(S) : Baraff et al.

It is certified that error appears in the above-identified patent and that said Letters Patent is hereby corrected as shown below:

On the Title Page:

At item (54), in the second line of the title, please delete "INTESECTIONS" and insert --INTERSECTIONS--.

On page 2:

Under OTHER PUBLICATIONS, in the second line of the first entry (Bridson), please delete "contract" and insert --contact--.

In the claims:

In claim 1, column 10 at line 62, please delete "path; and" and insert -- path, the determining comprising:

selecting an arbitrary edge of a mesh that crosses said intersection path where said arbitrary edge is formed by vertices $u$ and $v$ and where said mesh contains said intersection path;

performing a search of said mesh, radiating from one of said vertices $u$ and $v$, identifying all vertices in all of said edges that cross said intersection path, and defining the set of vertices identified as a playpen;

tracing said intersection path and identifying vertices, within said playpen, on a left side of said intersection path as left and retracing said intersection path in an opposite direction and identifying vertices, with said playpen, on a right side of said intersection path as right;

determining whether vertices adjacent to vertices identified as left and right lie outside of said playpen;

discarding said intersection path when at least one of both left and right identified vertices lie outside said playpen; and determining whether at least one vertex adjacent to said right identified vertices lies outside said playpen; and characterizing each of said left identified vertices as contained within said intersection path when at least one vertex adjacent to said right identified vertices lies outside said playpen and characterizing each of said right identified vertices as contained within said intersection path when at least one vertex adjacent to said left identified vertices lies outside said playpen; and--.

UNITED STATES PATENT AND TRADEMARK OFFICE
CERTIFICATE OF CORRECTION

PATENT NO. : 6,970,171 B2
APPLICATION NO. : 09/851940
DATED : November 29, 2005
INVENTOR(S) : Baraff et al.

It is certified that error appears in the above-identified patent and that said Letters Patent is hereby corrected as shown below:

In claim 2, column 11 at line 1, please delete "determining".

In claim 2, column 11 at line 8, please delete "add" and insert -- and --.

In claim 5, column 11 at line 39, please delete "comprises;" and insert -- comprises: --.

In claim 5, column 11 at line 47, please delete "disconnect regions" and insert -- disconnected region --.

In claim 6, column 12 at line 26, please delete "comprising;" and insert -- comprising: --.

In claim 10, column 13 at line 41, please delete "comprises;" and insert -- comprises: --.

Signed and Sealed this

Fifteenth Day of August, 2006

JON W. DUDAS
*Director of the United States Patent and Trademark Office*